Patented Aug. 31, 1943

2,328,101

UNITED STATES PATENT OFFICE 2,328,101

METHOD OF PROVIDING ADHERENT METAL COATINGS ON SURFACES

Edgar F. Rosenblatt, East Orange, N. J., assignor to Baker & Company, Inc., Newark, N. J., a corporation of New Jersey No Drawing. Continuation of application June 17, 1939, Serial No. 279,677. This application January 28, 1941, Serial No. 376,335

12 Claims. (Cl. 117—65)

This invention relates to the provision of adherent metal coatings on surfaces and is directed particularly to the provision of platinum metal coatings and a method of providing them.

The present application is a division and continuation of my application Serial No. 279,677 filed June 17, 1939, which in turn is a continuation in part of my earlier application Serial No. 66,068½ filed February 27, 1936, now Patent No. 2,166,076 dated July 11, 1939.

Metal coatings on supports have been provided heretofore by various means such as evaporation in vacuum, cathode sputtering, electro-deposition, chemical deposition, etc. Methods involving electro-deposition are limited to supports of electrically conductive materials, whereas methods such as evaporation in vacuum, cathode sputtering or chemical deposition may be employed even where the support comprises an electrically non-conductive material.

In providing surface coatings of metals of the platinum group it was found in experiments with platinum, palladium and the like metals of the platinum group that surfaces produced by chemical deposition involving reducing under heat, compounds of such metals are not sufficiently adherent, particularly on surfaces of ceramic materials and other non-metallic material in the absence of large amounts of flux. The use of flux, however, impairs the color as well as other properties for instance electrical and catalytic, of such metallic deposits.

It is one object of my invention to provide a method by means of which it is possible to provide adherent coatings of a platinum metal on non-metallic supports, including supports having poor or no electrical conductivity. It is a further object of my invention to thus provide corrosion resistant articles of non-metallic material, in particular materials having poor or no electrical conductivity, provided with a surface coating or layer of platinum metal.

I have found that ruthenium can be deposited on ceramic materials such as porcelain, quartz, glass and the like, or on other non-metallic materials, by means of chemical deposition to form, as distinguished from other metals of the platinum group, strongly adherent coatings or layers, without resorting to such complicated or otherwise undesirable means as cathode sputtering, evaporation in vacuum or the like.

In carrying out my invention I spread, for instance, by painting or spraying or the like, a coating composition containing a ruthenium compound over the surface to be coated, and then decompose the ruthenium compound by heat, whereupon a mirror-like surface of ruthenium is formed which adheres firmly to the under surface.

My method of depositing ruthenium is applicable to metallic as well as non-metallic surfaces, but it is of particular importance in connection with its application to ceramic materials such as porcelain, quartz, glass and the like, or other non-metallic materials, including non-metallic materials having poor or no electrical conductivity, hereinafter referred to as electrically non-conductive materials.

I have found that in its property of adherence, ruthenium differs greatly from the other members of the platinum group which cannot be deposited by similar methods on electrically non-conductive surfaces to produce a firmly adherent coating or layer unless the metal is greatly diluted with a flux. A ruthenium deposit of great adherence, however, can be obtained on any material without complicated processes and without the use of diluting fluxes. The deposit is so adherent that it withstands without appreciable abrasion even the action of a quickly rotated polishing wheel.

The coating composition according to my invention consists of ruthenium compounds dissolved in a liquid solvent. Any ruthenium compound soluble in the solvent employed can be used, such as for instance ruthenium nitrosochloride in water. I have found, however, that the best coatings are obtained with ruthenium compounds of the type described in my earlier application No. 66,068½, now Patent No. 2,166,076, that is compounds produced by a reaction between a complex containing ruthenium and having at least one nitrite group or a nitroso group, hereinafter called (—O—) NO group, on the one hand and an organic compound having a reactive hydrogen, in particular phenol, including naphthol, or an aromatic organic compound, including aromatic amine, on the other hand, the reaction taking place between the oxygen of the (—O—) NO group and the reactive hydrogen of the organic compound, and resulting in a compound containing the radicals of both starting compounds combined in one molecule, among which compounds I prefer to use those produced by a reaction with phenols, including naphthols. Other equally good deposits are obtained with ruthenium nitroso compounds, for instance ruthenium nitroso chloride, nitrate, acetate, formate, iodide or bromide. These compounds are very stable in their solvents and I have found that they produce a coating composition which does not tend to crystallize on evaporation, thus forming, on heating, a very uniform mirror-like surface.

In order to produce the compounds described in my earlier application I may for instance dissolve 1 g. sodium ruthenium nitrite having the formula Na₃Ru(NO₂)₆, in a small amount of water, and 1 g. of alpha-naphthol, 6 cc. of ortho-toluidine and 4 cc. of acetic acid, whereupon the mixture is warmed on a water bath; after benzol is added the mixture is shaken and then separated in a separatory funnel; the benzol solution containing the reaction compound is washed with water and dried with potassium carbonate and is then filtered.

Or I may take for instance 1 g. of ruthenium nitroso chloride having the formula RuNOCl₃ and 1 g. of alpha-naphthol which are dissolved and boiled in acetic acid; the solution is finally evaporated giving a resinous mass which is soluble in certain organic solvents such as isoamyl alcohol, acetic acid, oil of lavender and others.

The solvent for the ruthenium compound may consist of any suitable liquid medium in which the ruthenium compound employed is soluble. It may consist of water or any volatile inorganic or organic liquid. In general, I prefer to use organic solvents, particularly when the ruthenium compound consists of a compound obtained by reacting a ruthenium complex containing an (—O—) NO group with an organic compound having a reactive hydrogen. I have found that excellent results can be obtained for instance with such organic solvents as alcohol, including methyl, propyl, amyl, methyl-iso-butyl alcohol, amylacetate, ethyl-acetoacetate, acetone, acetic acid, ethyl acetyl glycolate, diethyl phthalate, lavender oil, oil of turpentine, benzol, toluol, rosin, camphor, phenol, naphthol, vaseline, either alone or in various mixtures thereof. In general, the more readily volatile solvents are as good or even better than the heavier solvents, but the painting of the coating composition is somewhat easier in the case of the heavier organic solvents.

The addition of oils or rosin tends to produce a bluish blush of the ruthenium deposit. For painting of large surfaces, I have found it convenient to use a mixture of propyl-alcohol with methyl-iso-butyl alcohol, but for other purposes this kind of solution shows too great a tendency to spread over the surface. It is advantageous to use a solvent which will not decompose under formation of deposits of carbon or other products, as such deposition might affect the character of the ruthenium deposit; for this reason the usually employed oils are by no means especially favorable in connection with the deposition of ruthenium according to my invention.

After the coating composition has been applied it may be allowed to dry, whereupon the ruthenium compound is decomposed to form a metallic ruthenium mirror-like surface. The decomposition is carried out by heating with a direct flame or by heating in a furnace in a reducing atmosphere as furnished for instance by hydrogen or a hydrogen-nitrogen mixture. The temperature necessary for the decomposition may be very low, for instance 350 to 400° C. or even less. In order to obtain a perfect adherence, it is advisable to anneal at a somewhat higher temperature. I have further discovered that the adherence of ruthenium coatings can be still further increased by incorporating in the solvent an acid of sulphur or phosphorus, such as sulphuric acid, phosphoric or phosphorous acid, although it appears that acids of phosphorus are superior in their effect. Usually, the amount so added is small, less than 1%.

In one experiment I dissolved 5 g. of ruthenium nitroso bromide, Ru NO Br₃ H₂O, in 50 cc. of propyl alcohol and 50 cc. of methyl-iso-butyl alcohol. I then added 1 cc. phosphoric acid. The resultant coating composition was spread on porcelain and allowed to dry for a short period, whereafter I heated the distributed coating composition by a gas flame. A brilliant mirror-like highly reflecting surface of extremely adherent metallic ruthenium was formed. In connection with this example it is understood that none of the quantities stated are critical. The coating composition can be more concentrated or less concentrated than stated. Drying is not necessary and again may without harm be extended over several hours.

My invention makes it possible to provide, therefore, a firmly adherent layer or coating on any suitable support and including in particular such supports where electro-deposition is not available. Ruthenium is resistant to weather, acids and alkalies and the coating obtained in accordance with my invention is mechanically strong.

Articles having a body or support of ceramic material or other non-metallic or electrically non-conducting material provided with a direct layer or coating of ruthenium are susceptible of many advantageous uses. They can be used as mirrors or reflectors, for instance dental or medical mirrors and the like, as they are resistant to chemical and mechanical attack and withstand for instance hot water or steam which are usually employed by the medical and dental profession for the sterilization and cleaning of instruments. As the surface layer of ruthenium can be made either thick or thin, as desired, articles of glass or other transparent material having a ruthenium deposit layer or coating can be used for instance as step wedges or smoked glasses. Articles according to the invention can also be used as resistors, for instance porcelain or glass resistors having a surface coating of ruthenium, possessing great ohmic resistance but less than glass or porcelain not provided with a ruthenium coating.

My invention is also applicable to the decorative arts for the production of designs or writing on surfaces, particularly on ceramic surfaces. As the ruthenium deposit is permanent and not corroded, my invention is also applicable to the production of permanent records on metallic and non-metallic surfaces.

As ruthenium has catalytic properties, articles according to my invention having a surface coating of ruthenium may also be used as catalysts for various catalytic reactions. Such catalysts may consist for instance of a non-metallic carrier such as a carrier of silica gel, pumice, asbestos, silicon carbide, glass wool, porcelain beads, refractory oxides, and other materials, the carrier being provided with an adherent layer or deposit of ruthenium or ruthenium alloy. As the use of flux deleteriously affects the catalytic activity of platinum metal deposists, catalysts produced in accordance with this invention, without the necessary use of flux, are thus of particular advantage.

For many uses it is desirable to provide an article having a body of non-metallic or electrically non-conductive material provided with an outer surface of such metals as platinum, rhodium, iridium or palladium. My invention, therefore, also contemplates the provision of a coating or layer of ruthenium, as described, and superimposed thereon a layer of a dissimilar metal, such as for example, rhodium, etc., by any suitable means, as for instance electro-deposition. Thus the color or reflectivity or catalytic properties of my ruthenium deposits can be changed or improved by first depositing an adherent layer or coating of metallic ruthenium, in accordance with my invention, and then superimposing thereon directly or indirectly a deposit of a metal or alloy having the desired color or reflectivity. Whereas it is not possible for instance to provide an adherent layer of platinum or rhodium on ceramic materials and the like, without flux, my invention makes it possible to provide such adherent deposits by first interposing an adherent layer of ruthenium.

The method in accordance with my invention is equally applicable to the provision of adherent coatings or layers of ruthenium alloys. For some purposes, for instance for the purpose of obtaining different or better color or reflectivity, alloys of ruthenium may be preferable to pure ruthenium. For this purpose I provide a coating composition containing not only a ruthenium compound but also a compound of the alloying metal or compounds of the alloying metals, care being taken, however, that the resultant deposit of ruthenium alloy still retains the characteristic properties of my ruthenium deposit, namely its firm adherence, for which reason I prefer deposits which contain at least approximately 50% ruthenium. For practical purposes I prepare a ruthenium coating composition and another coating composition containing a compound of the alloying metal or compounds of the alloying metals and then mix the coating compositions. Again as in the case of ruthenium compounds excellent results are obtained by the use of compounds of a platinum metal obtained by reacting a complex of such metal having an (—O—) NO group, including nitrite as well as nitroso group, with an organic compound having a reactive hydrogen, some such reaction compounds also being described in my aforesaid application. The term "ruthenium" as used in the appended claims shall be interpreted, therefore, to include such alloys of ruthenium.

What I claim is:

1. The method of depositing ruthenium on surfaces comprising providing a coating composition containing a ruthenium compound dissolved in a liquid medium, distributing said coating composition over the surface and decomposing the ruthenium compound by heating under reducing conditions to form a coating of metallic ruthenium.

2. The method of depositing ruthenium on surfaces comprising providing a coating composition containing a ruthenium compound dissolved in a liquid medium, distributing said coating composition over the surface and decomposing the ruthenium compound by heating with a direct flame to form a coating of metallic ruthenium.

3. The method of depositing ruthenium on surfaces comprising providing a coating composition containing a ruthenium compound dissolved in an organic liquid medium, distributing said coating composition over the surface and decomposing the ruthenium compound by heating under reducing conditions to form a coating of metallic ruthenium.

4. The method of depositing ruthenium on surfaces comprising providing a coating composition containing a ruthenium nitroso compound dissolved in an organic medium which is volatile without formation of carbon deposit, distributing said coating composition over the surface and decomposing the ruthenium compound by heating under reducing conditions to form a coating of metallic ruthenium.

5. The method of depositing ruthenium on surfaces comprising providing a coating composition containing a ruthenium compound produced by a reaction between a complex containing ruthenium and having at least one (—O—) NO group and an organic compound having a reactive hydrogen, said compound containing the radicals of both starting compounds combined in one molecule, dissolved in an organic liquid medium, distributing said coating composition over the surface and decomposing the ruthenium compound by heating under reducing conditions to form a coating of metallic ruthenium.

6. The method of depositing ruthenium on surfaces comprising providing a coating composition containing a ruthenium compound produced by a reaction between a complex containing ruthenium and having at least one (—O—) NO group and a phenol, said compound containing the radicals of both starting compounds combined in one molecule, dissolved in an organic liquid medium, distributing said coating composition over the surface and decomposing the ruthenium compound by heating under reducing conditions to form a coating of metallic ruthenium.

7. The method of depositing ruthenium on non-metallic surfaces comprising providing a coating composition containing a ruthenium compound dissolved in a liquid medium, distributing said coating composition over the surface and decomposing the ruthenium compound by heating under reducing conditions to form a deposit of metallic ruthenium.

8. The method of depositing platinum metal on non-metallic surfaces comprising providing a coating composition containing a ruthenium compound dissolved in a liquid medium, distributing said coating composition over the surface and decomposing the ruthenium compound by heating under reducing conditions to form a deposit of metallic ruthenium, and then depositing another platinum metal thereon.

9. The method of depositing ruthenium alloys on surfaces comprising providing a coating composition containing a ruthenium compound and a compound of an alloying metal dissolved in a liquid medium, distributing said coating composition over a surface and decomposing the metal compounds by heating under reducing conditions to form a deposit of metallic ruthenium alloy.

10. The method of depositing ruthenium on surfaces comprising providing a coating composition containing a ruthenium compound dissolved in a liquid medium containing a small amount of an acid of the group consisting of acids of sulphur and phosphorus, distributing said coating composition over a surface and decomposing the ruthenium compound by heating under reducing conditions to form a deposit of metallic ruthenium.

11. The method of depositing ruthenium on surfaces comprising providing a coating composition containing a ruthenium compound dissolved in a liquid medium, distributing said coating composition over the surface and decomposing the ruthenium compound by heating under reducing conditions to form a deposit of metallic ruthenium, and annealing said deposit at a higher temperature to render the same more adherent.

12. The method of providing an adherent layer of platinum metal on non-metallic supports, comprising depositing ruthenium on a non-metallic material by distributing over the surface of said non-metallic material a coating composition containing a ruthenium compound dissolved in a liquid medium and decomposing the ruthenium compound by heating under reducing conditions to form a deposit of metallic ruthenium.

EDGAR F. ROSENBLATT.